(12) United States Patent
Waltner et al.

(10) Patent No.: US 10,315,780 B2
(45) Date of Patent: Jun. 11, 2019

(54) TOUCHDOWN CONTROL SYSTEM

(71) Applicant: Sikorsky Aircraft Corporation, Stratford, CT (US)

(72) Inventors: Peter J. Waltner, Royal Palm Beach, FL (US); Nikolas A. Macko, Stuart, FL (US); Daniel Bazzani, Stuart, FL (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 109 days.

(21) Appl. No.: 15/496,126

(22) Filed: Apr. 25, 2017

(65) Prior Publication Data
US 2018/0305038 A1 Oct. 25, 2018

(51) Int. Cl.
*B64D 45/06* (2006.01)
*B64C 27/10* (2006.01)
*B64C 27/82* (2006.01)

(52) U.S. Cl.
CPC .............. *B64D 45/06* (2013.01); *B64C 27/10* (2013.01); *B64C 27/82* (2013.01); *B64C 2027/8236* (2013.01)

(58) Field of Classification Search
CPC ......... B64D 45/06; B64C 27/10; B64C 27/82; B64C 2027/8236
See application file for complete search history.

(56) References Cited

U.S. PATENT DOCUMENTS

| 6,527,225 | B1 | 3/2003 | Silder, Jr. et al. |
| 6,629,023 | B1 | 9/2003 | Silder, Jr. |
| 2006/0266883 | A1* | 11/2006 | Gmirya ................... B64C 27/10 244/60 |
| 2014/0124620 | A1* | 5/2014 | Giovangrossi ......... B64D 25/00 244/100 A |
| 2014/0249702 | A1* | 9/2014 | Pflug ..................... B64C 25/001 701/16 |
| 2014/0302461 | A1* | 10/2014 | Dumur ..................... G09B 9/46 434/33 |
| 2016/0325830 | A1 | 11/2016 | Waltner et al. |
| 2016/0327958 | A1 | 11/2016 | Vallart et al. |

FOREIGN PATENT DOCUMENTS

WO 2016210265 A1 12/2016

* cited by examiner

*Primary Examiner* — Calvin Cheung
(74) *Attorney, Agent, or Firm* — Cantor Colburn LLP

(57) ABSTRACT

A touchdown control system for a vertical take-off and landing (VTOL) aircraft including a detection controller receptive to aircraft state signals including one or more of an altitude signal, an aircraft attitude signal, an external environment signal, an aircraft velocity signal, an attitude rate signal, and a proximity signal. An enable controller is operatively connected to the detection controller. The enable controller selectively provides a touchdown control signal based on one or more of the altitude signal, the aircraft attitude signal, the external environment signal, the aircraft velocity signal, the attitude rate signal, and the proximity signal. A regulation controller is operatively connected to the enable controller. The regulation controller selectively adjusts aircraft control surfaces based on the touchdown control signal to facilitate final touchdown of the VTOL aircraft.

13 Claims, 2 Drawing Sheets

TOUCHDOWN CONTROL SYSTEM

BACKGROUND

Exemplary embodiments pertain to the art of vertical take-off and landing (VTOL) aircraft and, more particularly, to a touchdown control system for a VTOL aircraft.

During a final touchdown phase of a landing, pilots focus on aircraft attitude, sink rate and other factors to reduce forces on landing components such as wheels, skids and the like. Landings while one or more systems are failing add a level of complexity that may lead to undesirable forces on the aircraft. Autorotative landings, landings with one engine inoperative (OEI) require finesse and training to complete without exposing the aircraft to undesirable forces. Differences in pilot techniques, reactions and other factors contribute to a landing force variability that tends to expose aircraft landing components to asymmetric loads.

BRIEF DESCRIPTION

Disclosed is a touchdown control system for a vertical take-off and landing (VTOL) aircraft including a detection controller receptive to aircraft state signals including one or more of an altitude signal, an aircraft attitude signal, an external environment signal, an aircraft velocity signal, an attitude rate signal, and a proximity signal. An enable controller is operatively connected to the detection controller. The enable controller selectively provides a touchdown control signal based on one or more of the altitude signal, the aircraft attitude signal, the external environment signal, the aircraft velocity signal, the attitude rate signal, and the proximity signal. A regulation controller is operatively connected to the enable controller. The regulation controller selectively adjusts aircraft control surfaces based on the touchdown control signal to facilitate final touchdown of the VTOL aircraft.

In addition to one or more of the features described above or below, or as an alternative, further embodiments could include wherein the detection controller determines a proximity of a landing surface and an undesirable aircraft condition based on signals from the one or more of the altitude signal, the aircraft attitude signal, the external environment signal, the aircraft velocity signal, the attitude rate signal, and the proximity signal.

In addition to one or more of the features described above or below, or as an alternative, further embodiments could include wherein the undesirable aircraft condition includes one or more of an aircraft attitude exceeding a pre-selected aircraft attitude threshold, aircraft velocity exceeding a pre-selected velocity threshold, aircraft attitude exceeding a pre-selected attitude threshold, wind exceeding a pre-selected wind speed threshold, and an attitude of a landing surface exceeding a pre-selected landing surface attitude threshold.

In addition to one or more of the features described above or below, or as an alternative, further embodiments could include wherein the undesirable aircraft condition includes at least of a one engine inoperative (OEI) condition, a multiple engine inoperative (MEI) condition, and an all engine inoperative (AEI) condition.

In addition to one or more of the features described above or below, or as an alternative, further embodiments could include wherein the regulation controller selectively controls one or more of a yaw command, a pitch command, a roll command, a lift command, a velocity command, an attitude command, and a thrust command of the VTOL aircraft based on the touchdown control signal from the enable controller.

In addition to one or more of the features described above or below, or as an alternative, further embodiments could include wherein the enable controller issues the touchdown control signal based on an operating mode of the VTOL aircraft.

Also disclosed is a vertical take-off and landing (VTOL) aircraft including an airframe, a main rotor assembly supported by the airframe, at least one engine operatively connected to the main rotor assembly, a plurality of aircraft control surfaces associated with at least one of the main rotor assembly and the airframe, and a touchdown control system for a vertical take-off and landing (VTOL) aircraft. The touchdown control system includes a detection controller receptive to aircraft state signals including one or more of an altitude signal, an aircraft attitude signal, an external environment signal, a velocity signal, an attitude rate signal, and a proximity signal. An enable controller is operatively connected to the detection controller. The enable controller selectively provides a touchdown control signal based on one or more of the altitude signal, the aircraft attitude signal, the external environment signal, the velocity signal, the attitude rate signal, and the proximity signal. A regulation controller is operatively connected to the enable controller and one or more of the plurality of aircraft control surfaces. The regulation controller selectively adjusts aircraft control surfaces based on the touchdown control signal to facilitate final touchdown of the VTOL aircraft.

In addition to one or more of the features described above or below, or as an alternative, further embodiments could include wherein the detection controller determines a proximity of a landing surface and an undesirable aircraft condition based on signals from the one or more of the altitude signal, the aircraft attitude signal, the external environment signal, the aircraft velocity signal, the aircraft attitude signal, and the proximity signal.

In addition to one or more of the features described above or below, or as an alternative, further embodiments could include wherein the undesirable aircraft condition includes one or more of an aircraft attitude exceeding a pre-selected aircraft attitude threshold, aircraft velocity exceeding a pre-selected velocity threshold, aircraft attitude exceeding a pre-selected attitude threshold, wind exceeding a pre-selected wind speed threshold, and an attitude of a landing surface exceeding a pre-selected landing surface attitude threshold.

In addition to one or more of the features described above or below, or as an alternative, further embodiments could include wherein the at least one engine includes multiple engines, the undesirable aircraft condition including a malfunction of one or more of the multiple engines generating at least one of a one engine inoperative (OEI) condition, a multiple engine inoperative (MEI) condition, and an all engine inoperative (AEI) condition.

In addition to one or more of the features described above or below, or as an alternative, further embodiments could include wherein the regulation controller selectively controls one or more of a yaw command, a pitch command, a roll command, a lift command, an aircraft velocity command, an aircraft attitude command, and a thrust command of the VTOL aircraft based on the touchdown control signal from the enable controller.

In addition to one or more of the features described above or below, or as an alternative, further embodiments could include wherein the enable controller issues the touchdown control signal based on an operating mode of the VTOL aircraft.

In addition to one or more of the features described above or below, or as an alternative, further embodiments could include wherein the airframe includes an extending tail, and a tail rotor assembly supported by the extending tail.

In addition to one or more of the features described above or below, or as an alternative, further embodiments could include wherein the tail rotor assembly comprises a pusher-prop.

Further disclosed is a method of controlling a vertical take-off and landing aircraft during touchdown including detecting, through a processor, an imminent touchdown of the VTOL aircraft, sensing through the processor, a condition of the VTOL aircraft, including one of an pre-selected aircraft condition, a selected ground based condition, a selected wind speed, a selected aircraft velocity, and a type of passenger in the VTOL aircraft, enabling, through the processor, computer control of one or more aircraft control surfaces based on the condition of the VTOL aircraft, and regulating, through the processor, control of the one or more aircraft control surfaces based on the condition of the VTOL aircraft to facilitate touchdown.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
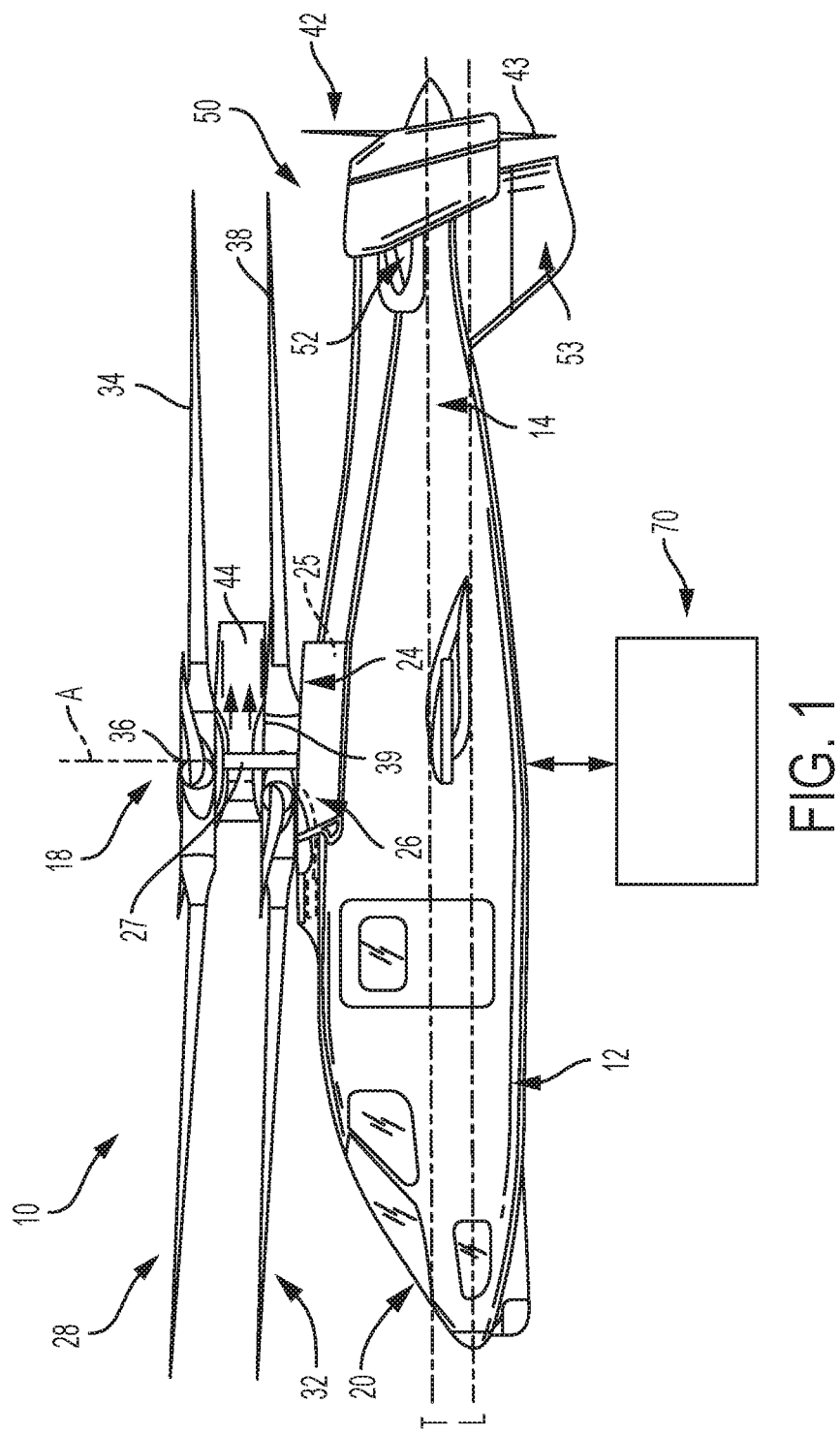
FIG. 1 depicts a rotary wing aircraft including a touchdown control system, in accordance with an exemplary embodiment.

FIG. 1 depicts an exemplary embodiment of a rotary wing, vertical takeoff and landing (VTOL) aircraft 10. VTOL aircraft 10 includes an airframe or fuselage 12 having a plurality of surfaces (not separately labeled), and an extending tail 14. A coaxial main rotor assembly 18 is located at fuselage 12 and rotates about a main rotor axis, A. In an exemplary embodiment, fuselage 12 includes a cockpit 20 having two seats for flight crew (e.g., pilot and co-pilot) and six seats for passengers (not shown). Main rotor assembly 18 is driven by a prime mover 24. In an example, prime mover 24 may comprise one or more engines indicated generally at 25, via a gearbox 26. It is to be understood that prime mover 24 may take on various forms. Main rotor assembly 18 may be operatively coupled to gearbox 26 through at least one main rotor shaft indicated generally at 27.

Main rotor assembly 18 includes an upper rotor assembly 28 that may be driven in a first direction (e.g., counter-clockwise) about the main rotor axis, A, and a lower rotor assembly 32 that may be driven in a second direction (e.g., clockwise) about the main rotor axis, A, opposite to the first direction (i.e., counter rotating rotors). Of course, it should be understood that upper and lower rotor assemblies 28 and 32 may be driven in the same direction.

In accordance with an exemplary embodiment, upper rotor assembly 28 includes a first plurality of rotor blades 34 supported by a first or upper rotor hub 36. Lower rotor assembly 32 includes a second plurality of rotor blades 38 supported by a second or lower rotor hub 39. In some embodiments, VTOL aircraft 10 may include a tail rotor assembly 42 located at extending tail 14. In the exemplary embodiment shown, tail rotor assembly 42 provides translational thrust (forward or rearward) for VTOL aircraft 10. Tail rotor assembly 42 includes a plurality of tail rotor blades 43.

Main rotor assembly 18 also includes a shaft fairing 44 generally located between and around the upper and lower rotor assemblies 28 and 32 such that lower rotor hub 39 may be at least partially contained therein. Shaft fairing 44 extends about rotor shaft 27. Shaft fairing 44 extends between lower rotor hub 39 and upper rotor hub 36 and operates to reduce drag which might otherwise exist at rotor shaft 27.

First plurality of rotor blades 34 may be connected to upper rotor hub 36 in a hingeless manner, also referred to as a rigid rotor system. Similarly, second plurality of rotor blades 38 may be connected to lower rotor hub 39 in a hingeless manner. Although a particular aircraft configuration is illustrated in this non-limiting embodiment, other rotary wing aircraft will also benefit from embodiments of the invention. Although aircraft 10 is shown with a dual rotor system, co-axial system, embodiments could also include other main rotor and tail rotor configurations including single rotor main rotor systems.

Moreover, aspects can be used in non-rotary wing aircraft, including fixed wing aircraft and tilt wing aircraft using rotor blades and/or propellers, and can be used in maritime propulsion systems, wind turbines and the like. Additionally, geared turbofans having a gearbox between engine output members and an axial fan shaft may also benefit from the exemplary embodiments. Still further, exemplary embodiments may be employed by aircraft including both fixed and retractable ground contact members or landing gear. Fixed landing gear may include one or more wheels or stationary skids.

Tail rotor assembly 42, is connected to, and driven by, prime mover 24 via gearbox 26. Tail rotor assembly 42 may be mounted to the rear of the fuselage 12 with a translational thrust axis, T, oriented substantially horizontal and substantially parallel to an aircraft longitudinal axis, L, to provide thrust for high-speed flight. The term "parallel" should be understood to include a translational thrust axis that is substantially aligned with the longitudinal axis. Translational thrust axis, T, corresponds to the axis of rotation of tail rotor assembly 42.

It is to be understood that while shown in the context of a pusher-prop configuration, tail rotor assembly could also take a more conventional form oriented to provide yaw control in addition to, or instead of, translational thrust. It is to be further understood that any such system or other propulsion assembly may alternatively or additionally be utilized including tail-less rotary wing aircraft. Alternative propulsion assemblies may include different propulsion forms, such as a jet engine. Further, it is to be understood that aircraft 10 may be configured with a propulsion assembly supported by pylons mounted to, and laterally outboard of, fuselage 12. In accordance with an aspect of an exemplary embodiment, tail rotor blades may include a variable pitch. More specifically, the pitch of tail rotor blades 43 may be altered to increase or decrease the thrust or to change the direction of thrust (e.g., forward, rearward, and/or off axis).

In accordance with another aspect of an exemplary embodiment, extending tail 14 includes a tail section 50 including starboard and port horizontal stabilizers, one of which is indicated at 52. Each horizontal stabilizer may include a corresponding elevator and rudder that act as controllable surfaces, e.g., surfaces that alter a flight path and/or characteristic of VTOL aircraft 10. Tail section 50 also includes a vertical stabilizer 53 that extends downward from extending tail 14, as well as elevators and rudders (not shown).

In accordance with an aspect of an exemplary embodiment, VTOL aircraft 10 includes a touchdown control system 70 that selectively controls one or more control surfaces of plurality of rotor blades 34 (not separately labeled), plurality of rotor blades 38 (also not separately labeled), and/or horizontal stabilizers 52 and vertical stabilizer 53 at a predetermined height above ground under certain flight conditions. Touchdown control system 70 promises a desired landing or touchdown envelope that maintains force levels on landing gear (not shown) at or below selected levels. It is to be understood that the term "landing gear" includes all forms of ground contact members, including both retractable landing gear and fixed gear, and stationary skids. It is also to be understood that the touchdown control system may establish a selected aircraft attitude that promotes substantially simultaneous contact of all ground contact members.

The term "touchdown" should be understood to describe a state in which ground contact is imminent. Imminent should be understood to describe a state in which the aircraft sufficiently close to the ground with a vertical velocity great enough that ground contact will occur in short order. For example, imminent could describe a state at which the aircraft is about 20-feet (6 meters) from ground or other surface contact at a vertical velocity of about 10 ft/sec 3 m/sec) or greater. The term "ground" should be understood to describe any surface that might support the aircraft including landing pads, ship decks, ground-based landing zones and the like.

Figure 2:
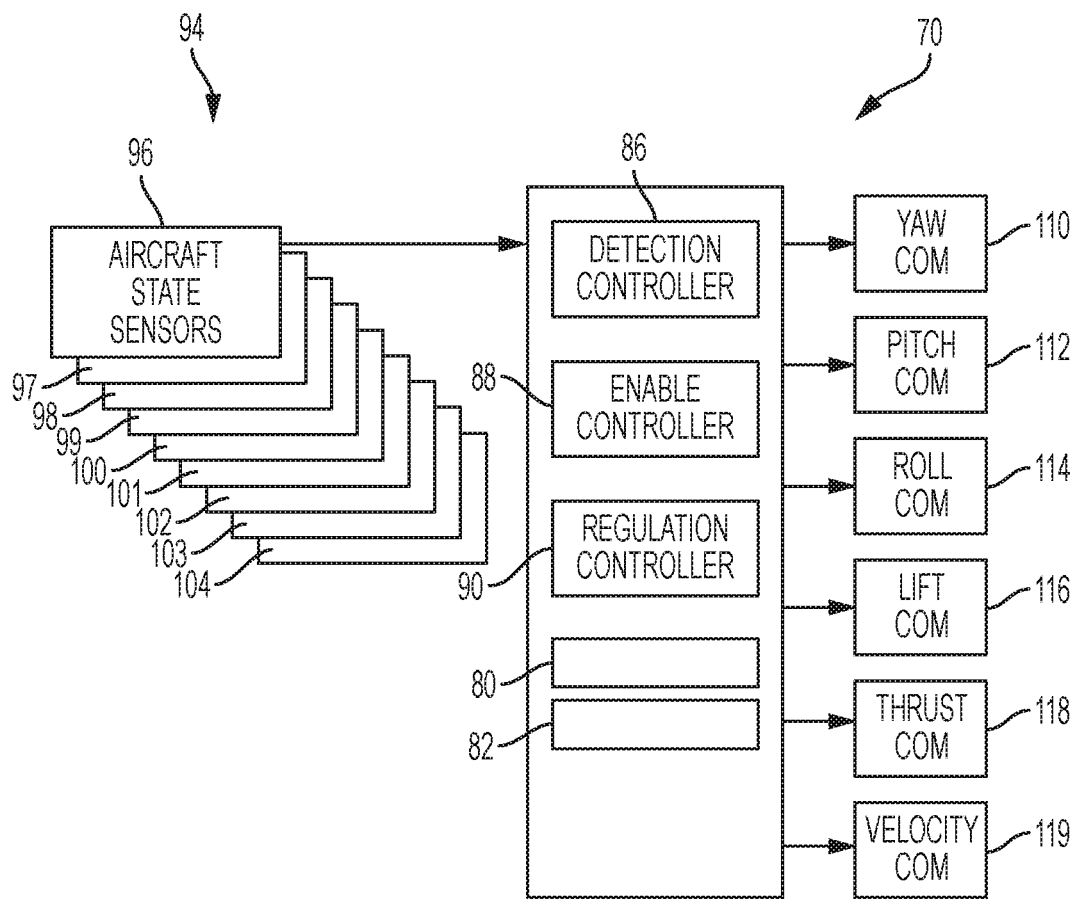
FIG. 2 is a block diagram illustrating the touchdown control system, in accordance with an aspect of an exemplary embodiment.

In accordance with an aspect of an exemplary embodiment illustrated in FIG. 2, touchdown control system 70 includes a central processor unit (CPU) 80 operatively connected to a non-volatile memory 82. Touchdown control system 70 also includes a detection controller 86, an enable controller 88, and a regulation controller 90 operatively connected to CPU 80. It is to be understood that while shown as being collocated, CPU 80, non-volatile memory 82, detection controller 86, enable controller 88, and regulation controller 90 may be housed separately and communicatively connected. Non-volatile memory 82 may store pre-selected state criteria such as a pre-selected wind speed threshold, a pre-selected decent threshold, a pre-selected aircraft attitude threshold, a pre-selected vertical descent rate threshold, a pre-selected touchdown lateral drift rate threshold, a pre-selected touchdown longitudinal drift rate threshold, a pre-selected attitude rate threshold, a pre-selected landing surface attitude threshold and the like that may be employed to activate touchdown control system 70.

In accordance with an aspect of an exemplary embodiment, touchdown control system 70 is operatively connected to a plurality of aircraft state sensors 94 that may include a ground proximity sensor 96 that may provide a ground proximity signal, an aircraft attitude sensor 97 that may provide an aircraft attitude signal, an altitude sensor 98 that may provide an altitude signal, an external environment sensors 99 that may provide an external environment signal including a wind speed signal, ground based condition sensor such as a landing platform and/or ground attitude sensor 100 that may provide a landing platform attitude signal, an engine sensor 101 that may provide an engine operating state signal, and a rotor speed sensor 102 that may provide a rotor speed signal and an attitude rate sensor 103 that may provide an attitude rate signal. Aircraft state sensors may also include an aircraft velocity sensor 104 that provides an aircraft velocity signal. The landing platform attitude signal may provide attitude data for a moving ship deck or the like. Aircraft state sensors may also include a gross weight or weight-on-wheels sensor or one or more operating mode sensors, such as a landing mode sensor, takeoff mode sensor and the like. The number and type of sensors may vary depending on aircraft type, model, variant and the like.

As will be detailed herein, touchdown control system 70 will, through CPU 80, control one or more control surface of VTOL aircraft 10 to facilitate a touchdown within a selected touchdown envelope to reduce pilot demand and prolong landing gear, support operational life. That is, depending on external factors such as wind speed, ground angle and the like, as well as aircraft state conditions, touchdown controller 70 may selectively signal a yaw command system 110, a pitch command system 112, a roll command system 114, a lift command system 116, and/or a thrust command system 118 to provide a velocity command 119 that may reduce pilot load during unconventional touchdowns. In other words, in the event that conditions exceed one or more pre-selected thresholds, such as the wind speed threshold, aircraft decent threshold, aircraft attitude threshold, attitude rate threshold, landing surface attitude threshold, rotor speed threshold, or engine operation state during touchdown, touchdown control system 70 may provide touchdown control and/or touchdown augmentation control as discussed herein.

It is to be understood that the lift command system 116 generally controls systems such as main rotor assembly 18 in conjunction with other control surfaces, including, for example, horizontal stabilizers 52. Depending upon rotorcraft type, lift command system 116 may also control additional lift systems. It is further to be understood that thrust command system 118 may control systems that control other thrust delivery members such as tail rotor assembly 42. It is also to be understood that thrust command system 118 may control other forms of thrust delivery systems.

In accordance with an aspect of an exemplary embodiment, detection controller 86 receives signals from aircraft state sensors 94 during a take-off and landing phase of flight. In the event that a pre-selected aircraft condition exists during touchdown, touchdown control system 70 assists a pilot with touchdown. A pre-selected aircraft condition may be an undesirable aircraft condition which may vary depending upon operating mode. An operating mode may represent a pre-selected aircraft condition and/or the transport of a particular type of passenger such as a VIP that may require touchdown within a pre-selected touchdown envelope.

Controlling VTOL aircraft 10 during touchdown is challenging under good conditions and may be even more so during undesirable conditions. Undesirable conditions may include an engine malfunction, such as a one engine inoperable (OEI), multiple engine inoperative (MEI), or all engine inoperative conditions, external environmental signals such as cross winds, and/or excessive velocities, excessive rate of decent, battle damage, foreign object damage (FOD) and the like may increase pilot load during touchdown. Due to differences in pilot training, pilot technique and other factors, touchdowns while the aircraft is in undesirable flight conditions may impart increased loads on landing systems such as skids, gear and the like.

In order to reduce pilot load and address differences in pilot training/technique, touchdown control system 70, may take-over or augment one of more aircraft control tasks in order to promote landings within a selected landing envelope. For example, touchdown control system 70 may detect, through detection controller 86 that touchdown is imminent. Touchdown control system 70 may also determine that a flight condition exists that would benefit from touchdown assistance. If touchdown is imminent and aircraft state signals exceed one or more pre-selected thresholds, detection controller 86 may output a touchdown control signal to enable controller 88. Enable controller 88 determines whether to activate touchdown control system 70 based on the touchdown signal from detection controller 86. If touchdown assist is indicated, enable controller 88 may enable regulation controller 90 to control or augment control of one or more aircraft control surfaces to facilitate the touchdown. In this manner, the pilot may concentrate on navigation tasks and touchdown control system 70 may facilitate a touchdown that reduces loads on landing components. It is noted that the detection controller 86, enable controller 88, and regulation controller 90 may be substantially integrated in a manner which provides small or negligible regulation outputs when regulation is not desired and appropriate outputs when regulation is required.

Non-limiting examples of conditions for which detection controller 86 may detect may include imminent touchdowns with an undesirable crab angle, lateral velocity component, positive or negative pitch attitude, positive or negative roll attitude, and/or vertical velocity. Regulation controller 90 may be tuned to regulate the aircraft state to maintain undesirable conditions below a certain threshold, tuned to target a specific condition such as touching down with level pitch and roll attitude with the aircraft yaw aligned with pitch, roll, and yaw rates zero, or any combination of maintaining thresholds and or targeting conditions at touchdown.

It is also to be understood that lift command 116 may be used to regulate the vertical velocity at touchdown and may incorporate rotor droop in maintaining desired thresholds or targeting desired touchdown conditions in the event of a one engine inoperable (OEI) landing or other emergent condition. In accordance with other exemplary aspects, landing loads can be minimized by touching down with a level attitude, aligned with the runway, with minimal pitch, roll, and yaw rates. The touchdown control system can assist the pilot in targeting these conditions by augmenting control commands to reduce landing loads experienced by the aircraft.

The terms "about" and "substantially" are is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A touchdown control system for a vertical take-off and landing (VTOL) aircraft comprising:
   a detection controller receptive to aircraft state signals including one or more of an altitude signal, an aircraft attitude signal, an external environment signal, an aircraft velocity signal, an attitude rate signal, and a proximity signal;
   an enable controller operatively connected to the detection controller, the enable controller selectively providing a touchdown control signal based on one or more of the altitude signal, the aircraft attitude signal, the external environment signal, the aircraft velocity signal, the attitude rate signal, and the proximity signal, wherein the enable controller issues the touchdown control signal based on an operating mode of the VTOL aircraft; and
   a regulation controller operatively connected to the enable controller, the regulation controller selectively adjusting aircraft control surfaces based on the touchdown control signal to facilitate final touchdown of the VTOL aircraft.

2. The touchdown control system according to claim 1, wherein the detection controller determines a proximity of a landing surface and an undesirable aircraft condition based on signals from the one or more of the altitude signal, the aircraft attitude signal, the external environment signal, the aircraft velocity signal, the attitude rate signal, and the proximity signal.

3. The touchdown control system according to claim 2, wherein the undesirable aircraft condition includes one or more of an aircraft attitude exceeding a pre-selected aircraft attitude threshold, aircraft velocity exceeding a pre-selected velocity threshold, aircraft attitude exceeding a pre-selected attitude threshold, wind exceeding a pre-selected wind speed threshold, and an attitude of a landing surface exceeding a pre-selected landing surface attitude threshold.

4. The touchdown control system according to claim 2, wherein the undesirable aircraft condition includes at least of a one engine inoperative (OEI) condition, a multiple engine inoperative (MEI) condition, and an all engine inoperative (AEI) condition.

5. The touchdown control system according to claim 1, wherein the regulation controller selectively controls one or more of a yaw command, a pitch command, a roll command, a lift command, a velocity command, an attitude command, and a thrust command of the VTOL aircraft based on the touchdown control signal from the enable controller.

6. A vertical take-off and landing (VTOL) aircraft comprising:

an airframe;

a main rotor assembly supported by the airframe;

at least one engine operatively connected to the main rotor assembly;

a plurality of aircraft control surfaces associated with at least one of the main rotor assembly and the airframe; and a touchdown control system for a vertical take-off and landing (VTOL) aircraft comprising:

a detection controller receptive to aircraft state signals including one or more of an altitude signal, an aircraft attitude signal, an external environment signal, a velocity signal, an attitude rate signal, and a proximity signal;

an enable controller operatively connected to the detection controller, the enable controller selectively providing a touchdown control signal based on one or more of the altitude signal, the aircraft attitude signal, the external environment signal, the velocity signal, the attitude rate signal, and the proximity signal, wherein the enable controller issues the touchdown control signal based on an operating mode of the VTOL aircraft; and a regulation controller operatively connected to the enable controller and one or more of the plurality of aircraft control surfaces, the regulation controller selectively adjusting aircraft control surfaces based on the touchdown control signal to facilitate final touchdown of the VTOL aircraft.

7. The VTOL aircraft according to claim 6, wherein the detection controller determines a proximity of a landing surface and an undesirable aircraft condition based on signals from the one or more of the altitude signal, the aircraft attitude signal, the external environment signal, the aircraft velocity signal, the aircraft attitude signal, and the proximity signal.

8. The VTOL aircraft according to claim 7, wherein the undesirable aircraft condition includes one or more of an aircraft attitude exceeding a pre-selected aircraft attitude threshold, aircraft velocity exceeding a pre-selected velocity threshold, aircraft attitude exceeding a pre-selected attitude threshold, wind exceeding a pre-selected wind speed threshold, and an attitude of a landing surface exceeding a pre-selected landing surface attitude threshold.

9. The VTOL aircraft according to claim 7, wherein the at least one engine includes multiple engines, the undesirable aircraft condition including a malfunction of one or more of the multiple engines generating at least one of a one engine inoperative (OEI) condition, a multiple engine inoperative (MEI) condition, and an all engine inoperative (AEI) condition.

10. The VTOL aircraft according to claim 6, wherein the regulation controller selectively controls one or more of a yaw command, a pitch command, a roll command, a lift command, an aircraft velocity command, an aircraft attitude command, and a thrust command of the VTOL aircraft based on the touchdown control signal from the enable controller.

11. The VTOL aircraft according to claim 6, wherein the airframe includes an extending tail, and a tail rotor assembly supported by the extending tail.

12. The VTOL aircraft according to claim 11, wherein the tail rotor assembly comprises a pusher-prop.

13. A method of controlling a vertical take-off and landing aircraft during touchdown comprising:

detecting, through a processor, an imminent touchdown of the VTOL aircraft;

sensing through the processor, a condition of the VTOL aircraft, including one of an pre-selected aircraft condition, a selected ground based condition, a selected wind speed, a selected aircraft velocity, and a type of passenger in the VTOL aircraft;

enabling, through the processor, computer control of one or more aircraft control surfaces based on the condition of the VTOL aircraft; and regulating, through the processor, control of the one or more aircraft control surfaces based on the condition of the VTOL aircraft to facilitate touchdown.

* * * * *